(12) United States Patent
Fujiwara

(10) Patent No.: US 9,815,990 B2
(45) Date of Patent: Nov. 14, 2017

(54) LUSTER COATING COMPOSITION, METHOD FOR PRODUCING MULTI LAYERED COATING FILM THEREWITH, AND MULTI LAYERED COATING FILM

(71) Applicant: NIPPON PAINT CO., LTD., Osaka (JP)

(72) Inventor: Shinichi Fujiwara, Aichi (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 170 days.

(21) Appl. No.: 14/419,982

(22) PCT Filed: Aug. 6, 2013

(86) PCT No.: PCT/JP2013/071260
§ 371 (c)(1),
(2) Date: Feb. 6, 2015

(87) PCT Pub. No.: WO2014/024884
PCT Pub. Date: Feb. 13, 2014

(65) Prior Publication Data
US 2015/0210867 A1 Jul. 30, 2015

(30) Foreign Application Priority Data
Aug. 7, 2012 (JP) ................ 2012-174982

(51) Int. Cl.
| | | |
|---|---|---|
| C09D 5/22 | (2006.01) | |
| B05D 7/06 | (2006.01) | |
| B05D 7/00 | (2006.01) | |
| C08K 3/22 | (2006.01) | |
| C09D 5/36 | (2006.01) | |
| C09D 201/00 | (2006.01) | |
| C09K 11/67 | (2006.01) | |
| C09D 7/12 | (2006.01) | |
| B05D 5/06 | (2006.01) | |
| C08K 3/00 | (2006.01) | |
| C08K 3/34 | (2006.01) | |
| C08K 3/36 | (2006.01) | |

(52) U.S. Cl.
CPC .............. *C09D 5/36* (2013.01); *B05D 5/066* (2013.01); *B05D 7/57* (2013.01); *C09D 5/22* (2013.01); *C09D 7/1275* (2013.01); *C09D 7/1291* (2013.01); *C09D 201/00* (2013.01); *C09K 11/671* (2013.01); *B05D 5/06* (2013.01); *C08K 3/0033* (2013.01); *C08K 3/22* (2013.01); *C08K 3/346* (2013.01); *C08K 3/36* (2013.01); *C08K 2003/2227* (2013.01); *C08K 2003/2241* (2013.01); *Y10T 428/256* (2015.01)

(58) Field of Classification Search
CPC .......... C09D 201/00; C09D 5/22; C09D 5/36; C09D 7/1275; C09D 7/129
See application file for complete search history.

(56) References Cited

U.S. PATENT DOCUMENTS 4,084,983 A 4/1978 Bernhard et al.

FOREIGN PATENT DOCUMENTS

| JP | 2001-327916 | 11/2001 |
| JP | 2004-275972 | 10/2004 |
| JP | 2008-521585 | 6/2008 |
| JP | 2011-45855 | 3/2011 |
| WO | 94/01498 | 1/1994 |
| WO | 2006/056870 | 6/2006 |

OTHER PUBLICATIONS

Machine translation JP 2011-045855. (2011).*
Extended European Search Report dated Jan. 7, 2016 in corresponding European patent application No. 13 827 895.7.
International Search Report dated Oct. 22, 2013 in International (PCT) Application No. PCT/JP2013/071260.
English translation of International Preliminary Report on Patentability and Written Opinion dated Feb. 19, 2015 in PCT/JP2013/071260.

* cited by examiner

*Primary Examiner* — Alexandre Ferre
(74) *Attorney, Agent, or Firm* — Wenderoth, Lind & Ponack, L.L.P.

(57) ABSTRACT

The purpose of the present invention is to provide a luster coating composition which can form a pearl color coating when used on automobile bodies, characterized in that bluish interference is insignificant in a highlight of the coating film, a yellowish transparent color is weak in a shade of the coating film and the white color development of the white base coating film is visible in every direction. The present invention provides a luster coating composition comprising an interference luster pigment and a titanium dioxide pigment, wherein a volume average particle size D90 of the titanium dioxide pigment is within a range of 700 to 1200 nm, and a volume average particle size D50 of the titanium dioxide pigment is within a range of 250 to 900 nm, and a mass ratio of the interference luster pigment and the titanium dioxide pigment is within a range of 10/1 to 5/1 represented in the mass ratio "the interference luster pigment/the titanium dioxide pigment". The present invention further provides a multi layered coating film obtained by a method for producing a multi layered coating film in which the luster coating composition is used, and a multi layered coating film formed thereby.

8 Claims, No Drawings

LUSTER COATING COMPOSITION, METHOD FOR PRODUCING MULTI LAYERED COATING FILM THEREWITH, AND MULTI LAYERED COATING FILM

TECHNICAL FIELD

The present invention relates to a luster coating composition, in particular, a luster coating composition for use on automobile bodies, and also relates to a method for producing a multi layered coating film with the composition, and a multi layered coating film.

BACKGROUND OF THE INVENTION

In recent years, white pearl color coating compositions containing what is called a luster pigment, the color of which varies with viewing angle, have been appreciated as coating compositions for use on automobile bodies. Such compositions can produce three-dimensional visual effects.

Luster pigments used in the design of such a coating color include interference mica pigments and the like. The interference mica pigments include mica or alumina flakes, coated with a metal oxide, in which the coating can cause light interference, so that pearl-like colors can be produced by the luster of the flake pigment and the interference-induced change in color. Unfortunately, the light interference also tends to produce undesired colors. For example, a white interference mica pigment in a highlight of a coating film looks bluish white (when the coating film is viewed from the front), and a shade of the coating film looks yellowish white (when the coating film is viewed from an oblique direction).

In the automobile industry, it has been desired that a white coating color, in particular, a white pearl coating color should be such that the color of a highlight looks whiter with no bluish interference color and the color of a shade looks white in every direction with no complementary yellow color.

JP 2001-327916 A (Patent Document 1) discloses a method for forming a multi layered pearl coating film including: a colored base coating film with an L value of 20 to 60 for lightness; and a mica-based coating film formed using a luster coating composition (containing mica as a luster pigment) containing titanium dioxide-coated silica flakes at a pigment weight concentration (PWC) within the range of 1 to 10%. According to this invention, the interference mica pigment-containing coating film contains a specific amount of titanium dioxide-coated silica flakes, so that the coating film can be less yellowish when viewed in a shade position.

However, the interference mica pigment used in the invention described in Patent Document 1 causes blue interference to remain when viewed in a highlight, and is less effective in suppressing bluish interference.

PRIOR ART DOCUMENTS

Patent Documents

Patent Document 1: JP 2001-327916 A

SUMMARY OF THE INVENTION

Problems to be Resolved by the Invention

It is an object of the present invention to form a luster coating composition which can form a pearl color coating when used on automobile bodies and is such that when the luster coating composition is applied to a base coating film to form a multi layered coating film, bluish interference is little in a highlight of the coating film, a yellowish transparent color is weak in a shade of the coating film, the color development of the base coating film is visible in every direction, and the luster and pearl-like color development of the luster pigment can be maintained.

It is another object of the present invention to provide a white pearl-colored, multi layered coating film which is such that when the multi layered coating film is produced by applying a white base coating composition to a substrate to form a white base coating film and then applying the luster coating composition to the white base coating film, bluish interference is little with strong whiteness in a highlight of the multi layered coating film, a yellowish transparent color is weak in a shade of the multi layered coating film, the multi layered coating film looks white in every direction, and the luster and pearl-light color development of the luster pigment are maintained.

It is a further object of the present invention to provide a multi layered coating film which also has the excellent heat-shielding effect by being produced using the luster coating composition containing titanium dioxide with a specific particle size distribution and/or using the white base coating composition containing titanium dioxide with a specific particle size distribution.

Means of Solving the Problems

The present invention provides a luster coating composition comprising an interference luster pigment and a titanium dioxide pigment, wherein a volume average particle size D90 of the titanium dioxide pigment is within a range of 700 to 1200 nm, and a volume average particle size D50 of the titanium dioxide pigment is within a range of 250 to 900 nm, and a mass ratio of the interference luster pigment and the titanium dioxide pigment is within a range of 10/1 to 5/1 represented in the mass ratio "the interference luster pigment/the titanium dioxide pigment".

A primary average particle size of the titanium dioxide pigment may preferably be within a range of 200 to 2000 nm.

The present invention also provides a method for producing a multi layered coating film comprising the steps of:

applying a white base coating composition comprising a titanium dioxide pigment to a substrate to form a white base coating film (step (1)), applying a luster coating composition comprising an interference luster pigment to the white base coating film to form a luster coating film (step (2)), and applying a clear coating composition to the luster coating film to form a clear coating film (step (3)).

The present invention also provides a multi layered coating film obtained by the method for producing a multi layered coating film.

The present invention also provides a means for obtaining a white pearl-colored, multi layered coating film with a high heat-shielding effect. Specifically, the present invention provides a multi layered coating film that has a significantly improved heat-shielding effect by being produced with the white base coating composition containing a titanium dioxide pigment with a primary average particle size of 200 to 2000 nm. Bluish interference can be suppressed in a highlight of the multi layered coating film by using a titanium dioxide pigment with a volume average particle size D90 of 700 to 1200 nm and a volume average particle size D50 of 250 to 900 nm in combination with the luster coating film.

Advantageous Effect of the Invention

According to the present invention, the luster coating composition for a pearl coating color is produced using an interference luster pigment for pearl-like color development in combination with a titanium dioxide pigment having a specific particle size distribution. With attention focused on the particle size distribution of a titanium dioxide pigment, the present invention has been accomplished based on the finding that the interference color development of an interference luster pigment can be weakened by using a titanium dioxide pigment with a D90 of 700 to 1200 nm and a 050 of 250 to 900 nm. Even when an interference luster pigment is used, the present invention makes it possible to reduce interference colors in both a highlight and a shade while maintaining the color development of the luster pigment, so that the design requirements in the field of automobile paint can be satisfied.

Although not limited to a specific theory, the technical effect mentioned above is considered to be related to the particle size of the titanium dioxide pigment as follows. If the titanium dioxide pigment has a particle size distribution with a large amount of smaller-size particles, a bluish color cannot be removed from a highlight because the small particles of titanium dioxide themselves are bluish. However, the use of titanium dioxide with a specific particle size distribution containing larger-size particles makes it possible to adequately block interference colors while maintaining pearl-like color development, so that pearl-like color development can be achieved with no bluish color in a highlight. In other words, the presence of titanium dioxide with such a particle size distribution makes it possible to achieve the original pear-like color development without degrading the pearl-like color development of the luster coating film and without producing a bluish interference color in a highlight or a yellowish transparent color in a shade.

DETAILED DESCRIPTION OF THE PREFERRED EMBODIMENTS

The luster coating composition of the present invention includes both an interference luster pigment and a specific titanium dioxide pigment.

Interference Luster Pigment

The interference luster pigment in the luster coating composition of the present invention is a pigment commonly used in pearl-colored coating compositions, and such a pigment may include at least one base material selected from the group consisting of a mica flake, a silica flake, an alumina flake, and a glass flake; and a metal oxide coating layer formed on the surface of the base material. In view of whiteness, the interference luster pigment may preferably be an alumina flake pigment having a surface coating of a metal oxide such as $TiO_2$ and hydrates thereof. The interference luster pigment may be of any shape. For example, when the interference luster pigment is flaky, it suitably has an average particle size D50 of 2 to 50 μm and a thickness of 0.1 to 3 μm.

The average particle size D50 is the volume average particle size measured by dynamic light scattering. More specifically, it may be measured with UPA-150 (a particle size distribution analyzer manufactured by Microtrac, Inc.).

The interference luster pigment is commercially available, such as Xirallic T60-10 WNT (an interference alumna flake pigment manufactured by Merck Ltd., Japan), Xirallic T60-23 WNT (an interference alumna flake pigment manufactured by Merck Ltd., Japan), PEARL-GLAZE SME 90-9 (a mica-based pearl pigment manufactured by NIHON KOKEN KOGYO CO., LTD.), and Metashine MC 1020 RS JA1 (manufactured by Nippon Sheet Glass Co. Ltd.), which are preferably used in view of providing whiteness and a lustrous three-dimensional effect.

Titanium Dioxide Pigment

The titanium dioxide pigment in the luster coating composition of the present invention has a specific primary particle size distribution and/or a specific secondary particle size distribution. The specific particle size distribution can be defined using the volume average particle sizes D90 and D50. Specifically, the titanium dioxide pigment in the luster coating composition needs to have a volume average particle size D90 of 700 to 1200 nm and a volume average particle size D50 of 250 to 900 nm. The volume average particle size D90 is the particle size at which the percentage of the total volume of particles with sizes smaller than and equal to a given particle size to the volume of all the particles reaches 90% in the particle size distribution of the titanium dioxide pigment. The volume average particle size D50 is the particle size at which the percentage reaches 50%. The volume average particle sizes D90 and D50 are measured by dynamic light scattering, specifically, using UPA-150 (a particle size distribution analyzer manufactured by Microtrac, Inc.).

The volume average particle size 090 of the titanium dioxide pigment is from 700 to 1200 nm, preferably from 800 to 1100 nm, more preferably from 900 to 1000 nm. If the volume average particle size D90 is less than 700 nm, the effect of suppressing the complementary color development of the interference luster pigment will be insufficient. If the volume average particle size D90 is more than 1200 nm, the luster of the resulting coating film will be reduced.

The volume average particle size D50 of the titanium dioxide pigment is from 250 to 900 nm, preferably from 270 to 800 nm, more preferably from 300 to 700 nm. If the volume average particle size D50 is less than 250 nm, the opacity of the resulting coating film will be reduced. If it is more than 900 nm, the design characteristics produced by the color development of the interference luster pigment will be reduced.

The titanium dioxide pigment may preferably have a primary average particle size of 200 to 2000 nm, more preferably 250 to 1600 nm in order to strike a balance between the resulting luster and the effect of suppressing the complementary color development of the interference luster pigment. Also, in order to obtain a heat-shielding effect, the primary average particle size of the titanium dioxide pigment may preferably be from 200 to 2000 nm, more preferably from 250 to 1600 nm. The primary average particle size can be measured by dynamic light scattering. More specifically, the primary average particle size can be measured using UPA-150 (a particle size distribution analyzer manufactured by Microtrac, Inc.) or an electron microscope.

The titanium dioxide pigment with a primary average particle size of 200 to 2000 nm is commercially available, such as TITANIX JR-1000 (manufactured by TAYCA CORPORATION, 800 nm in primary average particle size) or TIPAQUE CR-95 (manufactured by ISHIHARA SANGYO KAISHA, LTD., 250 nm in primary average particle size). Of course, these are non-limiting examples.

The luster coating composition includes two components: the interference luster pigment and the titanium dioxide pigment. The mass ratio of the interference luster pigment to the titanium dioxide pigment (the interference luster pigment/the titanium dioxide pigment) is from 10/1 to 5/1, preferably from 10/1 to 6/1. If the content of the interference luster pigment is so high that the mass ratio is more than 10/1, the finished appearance of the resulting coating film will be degraded. If the content of the interference luster pigment is so low that the mass ratio is less than 5/1, the luster can be lost, and the design characteristics produced by the color development of the interference luster pigment can be reduced.

In the luster coating composition, the interference luster pigment may preferably have a pigment weight concentration (PWC) of 1 to 30% by mass, more preferably 1 to 25% by mass, based an the total weight of all the resin components and all the pigments in the luster coating composition. In the luster coating composition, the titanium dioxide may preferably have a PWC of 0.1 to 5% by mass, more preferably 0.1 to 4% by mass. The total PWC of the interference luster pigment and the titanium dioxide pigment in the luster coating composition may preferably be from 1.1 to 35% by mass, more preferably from 1.1 to 30% by mass.

Binder Component

Besides the interference luster pigment and the titanium dioxide pigment, the luster coating composition of the present invention generally contains a coating film-forming resin as a binder component. The coating film-forming resin may be, for example, acrylic resin, polyester resin, alkyd resin, fluororesin, or the like. The binder component optionally contains a curing agent. The curing agent may be amino resin and/or a blocked polyisocyanate compound. The content of the solid of the binder component in the luster coating composition is within the range of 30 to 70% by mass when the coating composition is produced, and is within the range of 10 to 50% by mass when the coating composition is applied, based on the total amount of the coating composition.

Other Components

Besides the interference luster pigment, the titanium dioxide pigment, and the binder component, the luster coating composition of the present invention may generally contain a viscosity control agent for ensuring coating workability. The viscosity control agent may be generally a material having thixotropic properties, examples of which include a dispersion of swelling fatty acid amide, fatty acid amides, polyimide-based materials such as phosphates of long-chain polyaminoamide, polyethylene-based materials such as a dispersion of swelling colloidal polyethylene oxide, organic bentonite-based materials such as organic acid smectite clay and montmorillonite, inorganic pigments such as aluminum silicate and barium sulfate, flaky pigments having a shape capable of imparting viscosity, crosslinked or non-crosslinked resin particles, and the like.

If desired, the luster coating composition of the present invention may further contain other additives. Examples of such additives include surface modifiers such as silicone and organic polymers, curing catalysts, ultraviolet absorbers, hindered amines, hindered phenols, and the like. The content of these additives may be within the range known in the art.

If desired, the luster coating composition of the present invention may contain a luster pigment other than the interference luster pigment. In the luster coating composition, the total content of the interference luster pigment and the luster pigment other than the interference luster pigment may preferably be from 1 to SC % by mass, more preferably from 1 to 40% by mass, in terms of PWC. The luster pigment other than the interference luster pigment may be an aluminum flake pigment, a colored aluminum flake pigment, a glass flake pigment, a holographic pigment, a liquid crystal polymer pigment, or the like.

If desired, the luster coating composition of the present invention may also contain a color pigment. Examples of the color pigment include violet, blue, red, green, and yellow pigments. The heat-shielding effect can be increased by using two or more color pigments that make it possible to control lightness by subtractive color mixing. The PWC of the color pigment may preferably be from 0.1 to 30% by mass, more preferably from 0.1 to 20% by mass. The extender pigment may be talc, calcined kaolin, calcium carbonate, barium sulfate, or magnesium silicate. The PWC of the extender pigment may preferably be from 25 to 60% by mass, more preferably from 30 to 50% by mass.

The luster coating composition of the present invention may be of any coating type, such as any of an organic solvent-based coating composition, an aqueous (water-soluble, water-dispersible, or emulsion) coating composition, and a non-water-dispersible coating composition.

The luster coating composition of the present invention is prepared by mixing and dispersing the interference luster pigment, the other luster pigment, the titanium dioxide pigment, the binder component, the viscosity control agent, and other components.

In the preparation of the luster coating composition of the present invention, it is important to control the mass ratio of the added interference luster pigment to the added titanium dioxide pigment and to control the volume average particle sizes D90 and D50 of the titanium dioxide pigment being dispersed.

In particular, the volume average particle sizes D90 and D50 of the titanium dioxide pigment are most important, which can be controlled, for example, by controlling the medium for use in the dispersion and the dispersing time or other conditions in the process of preparing the coating composition. The volume average particle sizes may also be controlled by mixing two or more titanium dioxide pigments having different particle size distributions or by subjecting titanium dioxide pigments to classification or the like. In view of the control of the volume average particle sizes D90 and D50 of the titanium dioxide pigment, the luster coating composition may preferably be prepared by a process that includes previously and separately preparing a titanium dioxide pigment paste by mixing and dispersing the titanium dioxide pigment and raw materials for the coating composition, such as a dispersing agent, a dispersing resin, and/or a binder; and then mixing and dispersing other components into the titanium dioxide pigment paste.

Method for Producing a Multi Layered Coating Film

A method for producing a multi layered coating film according to the present invention includes the following steps:

applying a white base coating composition comprising a titanium dioxide pigment to a substrate to form a white base coating film (step (1)), applying a luster coating composition comprising an interference luster pigment to the white base coating film to form a luster coating film (step (2)), and applying a clear coating composition to the luster coating film to form a clear coating film (step (3)). The luster coating composition used in the step (2) is the above-described luster coating composition.

Substrate

A substrate used in the method for producing a multi layered coating film according to the present invention is not limited, and includes, for example, metals, glass, plastics, form bodies, in particular, a metal surface and a molding product. The substrate may preferably be a metal product which can be applied of cationic electrodeposition.

The metal product includes, for example, iron, copper, aluminum, tin, zinc and alloys thereof. Specifically, the metal product includes automobile bodies and automobile components such as an automobile, a truck, a motorcycle and a bus. The metal product may preferably be treated with a chemical conversion agent such as a phosphate chemical conversion agent, a chromium chemical conversion agent or a zirconium chemical conversion agent, more preferably have a chemical conversion layer and a cationic electrodeposition film.

Step (1)

In the method for producing a multi layered coating film according to the present invention, the step (1) includes applying a white base coating composition containing a titanium dioxide pigment to a substrate to form a white base coating film. The white base coating composition provides masking ability of a substrate and prevention of light transmission, and white design of a multi layered coating film. The white base coating composition may optionally be applied twice and heated and cured twice, in case that the white base coating composition does not have sufficient masking ability and prevention of light transmission.

In case that the white base coating composition is applied twice, a gray base coating film having L value of 20 to 60 may be used in the first application (lower coating film). The white base coating composition used in the step (I) contains a titanium dioxide pigment.

The titanium dioxide pigment in the white base coating composition is not limited, and includes a conventional titanium dioxide pigment. The titanium dioxide pigment may preferably have a primary average particle within a range of 200 to 2000 nm in view of improving heat-shielding effect, more preferably within a range of 250 to 1600 nm. The titanium dioxide pigment is commercially available, such as TITANIX JR-1000 (manufactured by TAYCA CORPORATION, 800 nm in primary average particle size) or TIPAQUE CR-95 (manufactured by ISHIHARA SANGYO KAISHA, LTD., 250 nm in primary average particle size).

The titanium dioxide pigment in the white base coating composition may preferably have a volume average particle size D90 within a range of 650 to 2000 nm, and a volume average particle size D50 within a range of 140 to 1100 nm. The titanium dioxide pigment having volume average particle sizes D90 and D50 described above can provide heat-shielding effect on a resultant coating film. A content of the titanium dioxide pigment in the white base coating composition is within a range of 30 to 75% by mass as a solid content of the coating composition.

The titanium dioxide pigment may preferably have a volume average particle size D90 within a range of 650 to 2000 nm, more preferably 700 to 1300 nm, most preferably 700 to 1200 nm. When the volume average particle size D90 is less than 650 nm, the heat-shielding effect may not be obtained. When the volume average particle size D90 is more than 2000 nm, coating gloss and film appearance deteriorates, and glossy of a coating film may be lost.

The titanium dioxide pigment may preferably have a volume average particle size 050 within a range of 140 to 1100 nm, more preferably 160 to 1000 nm, most preferably 160 to 900 nm. When the volume average particle size D50 is less than 140 nm, the heat-shielding effect may lower. When the volume average particle size D50 is more than 1000 nm, opacity of the resulting coating film may be deteriorated, and the resulting coating film may be a transparent film.

The white base coating composition contains a binder component in addition to the titanium dioxide pigment. As the binder component, the binder component contained in the luster coating composition may be used.

The white base coating composition may contain a conventional additive in addition to the titanium dioxide pigment and the binder component. The additive may include, for example, surface modifiers such as silicone or organic polymers, curing catalysts, ultraviolet absorbers, hindered amines, hindered phenols, and the like. The content of these additives may be within the range known in the art. The white base coating composition may be of any coating type, such as any of an organic solvent-based coating composition, an aqueous (water-soluble, water-dispersible, or emulsion) coating composition, and a non-water-dispersible coating composition.

A method for applying the white base coating composition in the step (1) is not limited, and may include a multi-stage coating method by air electrostatic spray coating in order to obtain excellent designability, preferably two-stage coating method; and a coating method combined with the air electrostatic spray coating and a rotary spray electrostatic coater, which is so-called "micro micro (up) bell", "micro ($\mu$) bell" or "metallic (meta) bell"; and the like. The white base coating composition can be applied on a substrate by use of the above coating method.

A dry coating film thickness of the white base coating composition according to the above coating method may vary depending on its use and is not limited, and for example 10 to 50 $\mu$m. When the dry coating film thickness is more than 50 $\mu$m, sharpness of a coating film may deteriorate, or irregularity, bubbles or sagging may be generated. When the dry coating film thickness is less than 10 $\mu$m, breakage of the coating film or insufficient opacity may be obtained.

The white base coating film obtained in the step (1) may be cured and may not be cured in this stage. In case that the white base coating film is cured, a curing condition may be 120 to 160° C. for 10 to 30 minutes, which may vary depending on a kind of a binder component in the white base coating composition. In case that the white base coating composition is an aqueous coating composition, a drying process after coating for removing water may preferably be performed, even if a curing process is not performed. The drying process may be, for example, a drying process at 20 to 80° C. for 1 to 10 minutes. The drying process can improve design characteristics and smoothness of a resultant multi layered coating film.

A white base coating film may preferably have a L value of not less than 80 and not more than 100. Such a L value can provide similar whiteness (L value) on a multi layered coating film and can provide a multi layered coating film having white pearl-like color. When the L value is less than 80, hue of a multi layered coating film may be a middle range and the multi layered coating film may be gray hue, not white pearl-like color. The L value can be measured by using commercially available colorimeter. For example, the L value can be determined by a L25 value of CM512m-3 (a spectrophotometric colorimeter manufactured by Konica Minolta, Inc.).

The white base coating film may optionally contain a color pigment. However, a L value of the white base coating film has to be within a range of 80 to 100, even if the white base coating film includes a color pigment. If the L value is outside the range, a resultant multi layered coating film does not have a white pearl-like color. The heat-shielding effect can be increased by using two or more color pigments that make it possible to control lightness by subtractive color mixing. Examples of the color pigment, include violet, blue, red, green, and yellow pigments. The PWC of the color pigment may preferably be from 0.1 to 30% by mass.

A color base coating film having a L value of not less than 20 and less than 80 in place of the white base coating film. In case of using the color base coating film having the L value, hue of a multi layered coating film may be a middle range and the multi layered coating film may be gray hue, not white pearl-like color. The L value can be measured by using commercially available colorimeter. For example, the L value can be determined by a 125 value of CM512m-3 (a spectrophotometric colorimeter manufactured by Konica Minolta, Inc.). The heat-shielding effect can be increased by using two or more color pigments that make it possible to control lightness by subtractive color mixing. Examples of the color pigment include violet, blue, red, green, and yellow pigments. The PWC of the color pigment may preferably be from 0.1 to 30% by mass, more preferably from 0.1 to 20% by mass.

Step (2)

In the method for producing a multi layered coating film according to the present invention, the step (2) includes applying a luster coating composition containing an interference luster pigment to the resultant white base coating film obtained by the step (1) to form a luster coating film. The luster coating composition may be the same as the luster coating composition described above. The luster coating composition can provide a luster coating film, and the luster coating film can provide luster and pearl-like interference color based on transmitted light and reflected light from the white base coating film for a resultant multi layered coating film.

A coating method and conditions of the subsequent treatment after coating of a luster coating film is similar as the method and conditions of the white base coating film in step (1). A dry coating film thickness of the luster coating film may preferably be within a range of 10 to 30 μm.

Step (3)

In the method for producing a multi layered coating film according to the present invention, the step (3) includes applying a clear coating composition to the luster coating film obtained by the step (2) to form a clear coating film.

The clear coating composition may contain a film-forming resin and a curing agent. The film-forming resin and the curing agent in the clear coating composition are not limited, and may be the film-forming resin and the curing agent contained in the white base coating composition. From the viewpoint of the transparency or acid etch resistance, the combination of the acrylic resin and/or polyester resin and an amino resin, or the acrylic resin and/or polyester resin having carboxylic acid-epoxy curing system and the like may be preferred. If the clear coating composition is an urethane-based clear coating composition, the clear coating composition may be either a one-liquid coating composition or a two-liquid coating composition.

The clear coating composition may further contain other additive. In particular, the clear coating composition may preferably contain a viscous controlling agent to prevent a generation of mixing; bleeding or sagging between a clear coating film and an underlying coating film. A solid content of the viscous controlling agent in the clear coating composition may be 0.01 to 10 parts by mass based on 100 parts by mass of a solid content of the coating composition, more preferably 0.02 to 8 parts by mass, most preferably 0.03 to 6 parts by mass. When the solid content is more than 10 parts by mass, film appearance may deteriorate. When the solid content is less than 0.01 part by mass, sufficient effect may not be obtained, which may result in a problem such as sagging.

The clear coating composition may be of any coating type, such as any of an organic solvent-based coating composition, an aqueous (water-soluble, water-dispersible, or emulsion) coating composition, and a non-water-dispersible coating composition like as the white base coating composition, as well as a powdered coating composition and a slurry coating composition.

A solid content of the clear coating composition is not limited and may be, for example, 20 to 60% by mass, more preferably 35 to SS % by mass. A solid content of the clear coating composition at the time of coating may be 10 to 50% by mass, preferably 20 to 50% by mass.

A coating method of the clear coating composition may be the coating method in the white base coating composition. A dry coating film thickness of the clear coating film is not limited and may vary, and may preferably be within a range of 10 to 70 μm.

After coating of the clear coating composition, the resultant clear coating film is cured. A curing condition may be, for example, 120 to 160° C. for 10 to 30 minutes, which may vary depending on a kind of a binder component in the clear coating composition. In case that the white base coating composition is an urethane clear coating composition, a curing condition may be 60 to 120° C. for 10 to 30 minutes.

A dry coating film thickness of a multi layered coating film obtained by the method for producing a multi layered coating film according to the present invention may be 30 to 300 μm, preferably 50 to 250 μm. When the dry coating film thickness of the multi layered coating film is less than 30 μm, strength of the coating film may deteriorate. When the dry coating film thickness of the multi layered coating film is more than 300 μm, film property such as cooling/heating cycle may deteriorate.

The multi layered coating film according to the present invention is obtained by the method for producing a multi layered coating film. The multi layered coating film is not the same as a conventional multi layered coating film containing interference luster pigments. In the present invention, the titanium dioxide with a specific particle size distribution contained in the luster coating film can prevent generation of a bluish color in a highlight and a yellowish color in a shade which degrade a pearl-like color. Therefore, the multi layered coating film has true pearl-like color, excellent whiteness and luminosity. In addition, the multi layered coating film has excellent heat-shielding effect by being produced using the luster coating composition containing the titanium dioxide with a specific particle size distribution and/or using the white base coating composition containing the titanium dioxide with a specific particle size distribution.

EXAMPLES

The present invention is more concretely illustrated below according to Examples, but the present invention is not limited only to these Examples.

Production of Coating Composition

White Base Coating Composition 1

A heat curable polyester resin (51.0 parts by mass, manufactured by Nippon Paint Co., Ltd., an acid value of the solid content; 8 mgKOH/g, a hydroxyl value: 80 mgKOH/g, a number average molecular weight: 1,800, a solid content: 70% by mass) and 49 parts by mass of TIPAQUE CR-97 (titanium dioxide manufactured by ISHIHARA SANGYO KAISHA, LTD., 200 nm in primary average particle size) were mixed to be uniform deposition. Then, 25.5 parts by mass of U-VAN 128 (melamine resin manufactured by Mitsui Cytec, Inc., a solid content: 60% by mass) was added thereto and mixed to be uniform dispersion, to obtain a white base coating composition 1. Volume average particle sizes D90 and D50 of the titanium dioxide pigment in the white base coating composition 1 measured by UPA-150 (a particle size distribution analyzer manufactured by Microtrac, Inc.) were 650 nm and 1000 nm, respectively.

A L value measured by CM512m-3 (a spectrophotometric colorimeter manufactured by Konica Minolta, Inc.) was 90.

White Base Coating Composition 2

A white base coating composition 2 was produced in the same manner as a production method of the white base coating composition 1 except that TITANIX JR-1000 (manufactured by TAYCA CORPORATION, 800 nm in primary average particle size) was used in place of TIPAQUE CR-97. Volume average particle sizes D90 and D50 of the titanium dioxide pigment in the white base coating composition 2 measured by UPA-150 (a particle size distribution analyzer manufactured by Microtrac, Inc.) were 900 nm and 1500 nm, respectively. A L value measured by CM512m-3 (a spectrophotometric colorimeter manufactured by Konica Minolta, Inc.) was 88.

Luster Coating Composition 1

An acrylic emulsion manufactured by Nippon Paint Co., Ltd. (271.5 parts by mass, a volume average particle size: 150 nm, a solid content: 20% by mass, an acid value of the solid content; 20 mgKOH/g, a hydroxyl value: 40 mgKOH/g), 10 parts by mass of an aqueous solution (10% by mass) of dimethyl ethanolamine, 27.4 parts by mass of a water-soluble acrylic resin manufactured by Nippon Paint Co., Ltd. (a solid content: 30% by mass, an acid value of the solid content; 40 mgKOH/g, a hydroxyl value: 50 mgKOH/g), 7.2 parts by mass of Primepole PX-1000 (a polyether polyol manufactured by Sanyo Kasei Co., Ltd., a solid content: 100% by mass), 28.2 parts by mass of Cymel 204 (an alkylated melamine resin manufactured by Mitsui Cytec Inc., a solid content: 100% by mass), 0.2 part by weight of lauryl acid phosphate, 4.0 parts by mass of Xirallic T60-23 WNT (an interference blue alumna flake pigment manufactured by Merck Ltd., Japan), 4.0 parts by mass of Xirallic T60-10 WNT (an interference alumna flake pigment manufactured by Merck Ltd., Japan) and 1.0 part by mass of TIPAQUE CR-95 (titanium dioxide manufactured by ISHIHARA SANGYC KAISHA, LTD., 250 nm in primary average particle size) were added in a container and dispersed with glass beads for 180 minutes to obtain a luster coating composition 1, having a mass ratio of 8/1 of the luster pigment/the titanium dioxide pigment. Volume average particle sizes D90 and D50 of the titanium dioxide pigment in the luster coating composition 1 measured by UPA-150 (a particle size distribution analyzer manufactured by Microtrac, Inc.) were 900 nm and 300 nm, respectively. Components contained in the luster coating composition are shown in Table 1.

Luster Coating Composition 2

A luster coating composition 2 was produced in the same manner as a production method of the luster coating composition 1 except that TITANIX JR-1000 was used in place of TIPAQUE CR-95. Volume average particle sizes D90 and D50 of the titanium dioxide pigment in the luster coating composition 2 were 900 nm and 800 nm, respectively. Components contained in the luster coating composition are shown in Table 1.

Luster Coating Composition 3

A luster coating composition 3 was produced in the same manner as a production method of the luster coating composition 1 except that 0.8 part by mass of TIPAQUE CR-95 was used and a mass ratio of the luster pigment/the titanium dioxide pigment was changed to 10/1. Volume average particle sizes D90 and D50 of the titanium dioxide pigment in the luster coating composition 3 were 900 nm and 300 nm, respectively. Components contained in the luster coating composition are shown in Table 1.

Luster Coating Composition 4

A luster coating composition 4 was produced in the same manner as a production method of the luster coating composition 1 except that 1.2 parts by mass of TIPAQUE CR-95 was used and a mass ratio of the luster pigment/the titanium dioxide pigment was changed to 7/1. Volume average particle sizes D90 and D50 of the titanium dioxide pigment in the luster coating composition 4 were 900 nm and 300 nm, respectively. Components contained in the luster coating composition are shown in Table 1.

Luster Coating Composition 5

A luster coating composition 5 was produced in the same manner as a production method of the luster coating composition 1 except that TIPAQUE CR-97 was used in place of TIPAQUE CR-95. Volume average particle sizes 090 and D50 of the titanium dioxide pigment in the luster coating composition 5 were 800 nm and 300 nm, respectively. Components contained in the luster coating composition are shown in Table 1.

Luster Coating Composition 6

A luster coating composition 6 was produced in the same manner as a production method of the luster coating composition 1 except that dispersion time was changed to 120 minutes. Volume average particle sizes D90 and D50 of the titanium dioxide pigment in the luster coating composition 6 were 1400 nm and 1000 nm, respectively. Components contained in the luster coating composition are shown in Table 1.

Luster Coating Composition 7

A luster coating composition 7 was produced in the same manner as a production method of the luster coating composition 1 except that dispersion time was changed to 270 minutes. Volume average particle sizes D90 and D50 of the titanium dioxide pigment in the luster coating composition 7 were 600 nm and 300 nm, respectively. Components contained in the luster coating composition are shown in Table 1.

Luster Coating Composition 8

A luster coating composition 8 was produced in the same manner as a production method of the luster coating composition 5 except that dispersion time was changed 270 minutes. Volume average particle sizes D90 and D50 of the titanium dioxide pigment in the luster coating composition 8 were 700 nm and 150 nm, respectively. Components contained in the luster coating composition are shown in Table 1.

Luster Coating Composition 9

A luster coating composition 9 was produced in the same manner as a production method of the luster coating composition 1 except that a content amount of TIPAQUE CR-95 was changed to 2.0 parts by mass and a mass ratio of the luster pigment/the titanium dioxide pigment was changed to 4/1. Components contained in the luster coating composition are shown in Table 1.

Luster Coating Composition 10

A luster coating composition 10 was produced in the same manner as a production method of the luster coating composition 1 except that a content amount of TIPAQUE CR-95 was changed to 0.5 part by mass and a mass ratio of the luster pigment/the titanium dioxide pigment was changed to 16/1. Components contained in the luster coating composition are shown in Table 1.

Luster Coating Composition 11

A luster coating composition 11 was produced in the same manner as a production method of the luster coating composition 1 except that the titanium dioxide pigment was not used. Components contained in the luster coating composition are shown in Table 1.

Luster Coating Composition 12

A luster coating composition 12 was produced in the same manner as a production method of the luster coating composition 2 except that dispersion time was changed to 240 minutes. Volume average particle sizes D90 and D50 of the titanium dioxide pigment in the luster coating composition 12 were 650 nm and 200 nm, respectively. Components contained in the luster coating composition are shown in Table 1.

Luster Coating Composition 13

A luster coating composition 13 was produced in the same manner as a production method of the luster coating composition 2 except that dispersion time was changed to 140 minutes. Volume average particle sizes D90 and D50 of the titanium dioxide pigment in the luster coating composition 13 were 1600 nm and 800 nm, respectively. Components contained in the luster coating composition are shown in Table 1.

Luster Coating Composition 14

A luster coating composition 14 was produced in the same manner as a production method of the luster coating composition 2 except that dispersion time was changed to 100 minutes. Volume average particle sizes D90 and D50 of the titanium dioxide pigment in the luster coating composition 14 were 1800 nm and 950 nm, respectively. Components contained in the luster coating composition are shown in Table 1.

Luster Coating Composition 15

A luster coating composition 15 was produced in the same manner as a production method of the luster coating composition 2 except that dispersion time was changed to 210 minutes. Volume average particle sizes D90 and D50 of the titanium dioxide pigment in the luster coating composition 15 were 1000 nm and 200 nm, respectively. Components contained in the luster coating composition are shown in Table 1.

Luster Coating Composition 16

A luster coating composition 16 was produced in the same manner as a production method of the luster coating composition 2 except that dispersion time was changed to 160 minutes. Volume average particle sizes D90 and D50 the titanium dioxide pigment in the luster coating composition 16 were 1000 nm and 950 nm, respectively. Components contained in the luster coating composition are shown in Table 1.

Luster Coating Composition 17

A luster coating composition 17 was produced in the same manner as a production method of the luster coating composition 1 except that TITANIX JR-1000 was used in place TIPAQUE CR-95 and dispersion time was changed to 190 minutes. Volume average particle sizes D90 and D50 of the titanium dioxide pigment in the luster coating composition 17 were 1000 nm and 600 nm, respectively. Components contained in the luster coating composition are shown in Table 1.

Luster Coating Composition 18

A luster coating composition 18 was produced in the same manner as a production method of the luster coating composition 1 except that TITANIX JR-1000 was used in place of TIPAQUE CR-95 and dispersion time was changed to 200 minutes. Volume average particle sizes D90 and D50 of the titanium dioxide pigment in the luster coating composition 18 were 900 nm and 500 nm, respectively. Components contained in the luster coating composition are shown in Table 1.

Clear Coating Composition 1

Mack flow O-1820 clear (an acid-epoxy curing type clear coating composition manufactured by Nippon Paint Co., Ltd.) was used.

TABLE 1

| | | A volume average particle size (nm) | | Type of the luster coating composition (PWC % by mass) | | | | | | | | | | | | | | | | |
|---|---|---|---|---|---|---|---|---|---|---|---|---|---|---|---|---|---|---|---|---|
| | | D90 | D50 | 1 | 2 | 3 | 4 | 5 | 6 | 7 | 8 | 9 | 10 | 11 | 12 | 13 | 14 | 15 | 16 | 17 | 18 |
| Luster pigment | Alumna flake T60-23 | — | — | 4.0 | 4.0 | 4.0 | 4.0 | 4.0 | 4.0 | 4.0 | 4.0 | 4.0 | 4.0 | 4.0 | — | — | — | — | — | 4.0 | 4.0 |
| | Alumna flake T60-10 | — | — | 4.0 | 4.0 | 4.0 | 4.0 | 4.0 | 4.0 | 4.0 | 4.0 | 4.0 | 4.0 | 4.0 | — | — | — | — | — | 4.0 | 4.0 |
| Titanium dioxide pigment | TIPAQUE CR-95 | 900 | 300 | 1.0 | — | 0.8 | 1.2 | — | — | — | — | 2.0 | 0.5 | — | — | — | — | — | — | — | — |
| | TITANNIX JR-1000 | 1000 | 200 | — | — | — | — | — | — | — | — | — | — | — | — | — | — | 1.0 | — | — | — |
| | | 650 | 200 | — | — | — | — | — | — | — | — | — | — | — | 1.0 | — | — | — | — | — | — |
| | | 900 | 500 | — | — | — | — | — | — | — | — | — | — | — | — | — | — | — | — | — | 1.0 |
| | | 1000 | 600 | — | — | — | — | — | — | — | — | — | — | — | — | — | — | — | — | 1.0 | — |
| | | 900 | 800 | — | 1.0 | — | — | — | — | — | — | — | — | — | — | — | — | — | — | — | — |
| | | 1600 | 800 | — | — | — | — | — | — | — | — | — | — | — | — | 1.0 | — | — | — | — | — |
| | | 1800 | 950 | — | — | — | — | — | — | — | — | — | — | — | — | — | 1.0 | — | — | — | — |
| | | 1000 | 950 | — | — | — | — | — | — | — | — | — | — | — | — | — | — | — | 1.0 | — | — |
| | TIPAQUE CR-95 | 1400 | 1000 | — | — | — | — | — | 1.0 | — | — | — | — | — | — | — | — | — | — | — | — |
| | TIPAQUE CR-95 | 600 | 300 | — | — | — | — | — | — | 1.0 | — | — | — | — | — | — | — | — | — | — | — |
| | TIPAQUE CR-97 | 800 | 300 | — | — | — | — | 1.0 | — | — | — | — | — | — | — | — | — | — | — | — | — |
| | TIPAQUE CR-97 | 700 | 150 | — | — | — | — | — | — | — | 1.0 | — | — | — | — | — | — | — | — | — | — |

Example 1

(1) Preparation of Test Plate

A 30 cm×40 cm, 0.8-mm-thick, dull steel sheet having a cationic electrodeposition coating film was provided. A white base coating composition 1 was applied to the dull steel sheet by spray coating to form a 30 µm-thick dry film, so that a white base coating film 1 was obtained. The L value of the white base coating film 1 was measured at an angle of 25° (L25) with CM512m-3 (a spectrophotometer manufactured by Konica Minolta Inc.). As a result, the measured L value was 85. Subsequently, using a rotary spraying electrostatic coating machine, a luster coating composition 1 was applied to the resulting white base coating film 1 by a one-stage coating process to form a 15-µm-thick dry film, so that a luster coating film 1 was obtained. The product was then pre-heated at 80° C. for 4 minutes.

Subsequently, using a rotary spraying electrostatic coating machine, a clear coating composition 1 was applied to the resulting luster coating film 1 by a one-stage coating process to form a 35-µm-thick dry film, so that a clear coating film 1 was obtained. The resulting white base coating film 1, luster coating film 1, and clear coating film 1 were cured at once by heating at 140° C. for 20 minutes, so that a test plate having a multi layered coating film was obtained.

(2) Evaluation

The design of the coating film of the resulting test plate was evaluated by evaluating the interference color (bluish) development state of its highlight, the transparent color (yellowish) development state of its shade, and the smoothness based on the criteria below. Table 2 shows the results.
Interference Color (Bluish) Development State of Highlight
  3: The highlight looks dimly bluish and has a soft design.
  2: The highlight looks slightly bluish.
  1: The highlight looks weakly bluish.
  0: The highlight looks intensely bluish.
Transparent Color (Yellowish) Development State of Shade
  3: The shade has almost no yellowish.
  2: The shade looks slightly yellowish.
  1: The shade looks weakly yellowish.
  0: The shade looks intensely yellowish.
Smoothness
  O: The surface of the coating film is smooth and flat.
  X: The surface of the coating film is significantly irregular.
Design Characteristics Produced by the Color Development of the Interference Luster Pigment
  O: Development of a pearl-like color is observed.
  X: Development of any pearl-like color is not observed.
Infrared Reflectance (%)
  The infrared reflectance (800 to 2500 nm) was measured using a spectrophotometer U4100 manufactured by Hitachi High-Technologies Corporation.

Example 2

A test plate was prepared in the same manner as Example 1 except that the white base coating composition 2 was used in place of the white case coating composition 1 to obtain a white base coating film 2. The resultant test plate was evaluated in the same manner as Example 1. Results of the test are shown in Table 2. A L value of the white base coating film 2 was 90, which was measured in the same manner as Example 1.

Example 3

A test plate was prepared in the same manner as Example 2 except that the luster coating composition 2 was used in place of the luster coating composition 1 to obtain a luster coating film 2. The resultant test plate was evaluated in the same manner as Example 1. Results of the test are shown in Table 2.

Example 4

A test plate was prepared in the same manner as Example 2 except that the luster coating composition 3 was used in place of the luster coating composition 1 to obtain a luster coating film 3. The resultant test plate was evaluated in the same manner as Example 1. Results of the test are shown in Table 2.

Example 5

A test plate was prepared in the same manner as Example 2 except that the luster coating composition 4 was used in place of the luster coating composition 1 to obtain a luster coating film 4. The resultant test plate was evaluated in the same manner as Example 1. Results of the test are shown in Table 2.

Example 6

A test plate was prepared in the same manner as Example 2 except that the luster coating composition 5 was used in place of the luster coating composition 1 to obtain a luster coating film 5. The resultant test plate was evaluated in the same manner as Example 1. Results of the test are shown in Table 2.

Example 7

A test plate was prepared in the same manner as Example 2 except that the luster coating composition 17 was used in place of the luster coating composition 1 to obtain a luster coating film 17. The resultant test plate was evaluated in the same manner as Example 1. Results of the test are shown in Table 2.

Example 8

A test plate was prepared in the same manner as Example 2 except that the luster coating composition 18 was used in place of the luster coating composition 1 to obtain a luster coating film 18. The resultant test plate was evaluated in the same manner as Example 1. Results of the test are shown in Table 2.

Comparative Example 1

A test plate was prepared in the same manner as Example 2 except that the luster coating composition 6 was used in place of the luster coating composition 1 to obtain a luster coating film 6. The resultant test plate was evaluated in the same manner as Example 1. Results of the test are shown in Table 2.

Comparative Example 2

A test plate was prepared in the same manner as Example 2 except that the luster coating composition 7 was used in place of the luster coating composition 1 to obtain a luster coating film 7. The resultant test plate was evaluated in the same manner as Example 1. Results of the test are shown in Table 2.

Comparative Example 3

A test plate was prepared in the same manner as Example 2 except that the luster coating composition 8 was used in place of the luster coating composition 1 to obtain a luster coating film 8. The resultant test plate was evaluated in the same manner as Example 1. Results of the test are shown in Table 2.

Comparative Example 4

A test plate was prepared in the same manner as Example 2 except that the luster coating composition 9 was used in place of the luster coating composition 1 to obtain a luster coating film 9. The resultant test plate was evaluated in the same manner as Example 1. Results of the test are shown in Table 2.

Comparative Example 5

A test plate was prepared in the same manner as Example 2 except that the luster coating composition 10 was used in place of the luster coating composition 1 to obtain a luster coating film 10. The resultant test plate was evaluated in the same manner as Example 1. Results of the test are shown in Table 2.

Comparative Example 6

A test plate was prepared in the same manner as Example 2 except that the luster coating composition 11 was used in place of the luster coating composition 1 to obtain a luster coating film 11. The resultant test plate was evaluated in the same manner as Example 1. Results of the test are shown in Table 2.

Comparative Example 7

A test plate was prepared in the same manner as Example 2 except that the luster coating composition 12 was used in place of the luster coating composition 1 to obtain a luster coating film 12. The resultant test plate was evaluated in the same manner as Example 1. Results of the test are shown in Table 2.

Comparative Example 8

A test plate was prepared in the same manner as Example 2 except that the luster coating composition 13 was used in place of the luster coating composition 1 to obtain a luster coating film 13. The resultant test plate was evaluated in the same manner as Example 1. Results of the test are shown in Table 2.

Comparative Example 9

A test plate was prepared in the same manner as Example 2 except that the luster coating composition 14 was used in place of the luster coating composition 1 to obtain a luster coating film 14. The resultant test plate was evaluated in the same manner as Example 1. Results of the test are shown in Table 2.

Comparative Example 10

A test plate was prepared in the same manner as Example 2 except that the luster coating composition 15 was used in place of the luster coating composition 1 to obtain a luster coating film 15. The resultant test plate was evaluated in the same manner as Example 1. Results of the test are shown in Table 2.

Comparative Example 11

A test plate was prepared in the same manner as Example 2 except that the luster coating composition 16 was used in place of the luster coating composition 1 to obtain a luster coating film 16. The resultant test plate was evaluated in the same manner as Example 1. Results of the test are shown in Table 2.

TABLE 2

| | | Example | | | | | | | | Comparative example | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 | 9 | 10 | 11 |
| Type of the white base coating composition | | 1 | 2 | 2 | 2 | 2 | 2 | 2 | 2 | 2 | 2 | 2 | 2 | 2 | 2 | 2 | 2 | 2 | 2 | 2 |
| Type of the luster coating composition | | 1 | 1 | 2 | 3 | 4 | 5 | 17 | 18 | 6 | 7 | 8 | 9 | 10 | 11 | 12 | 13 | 14 | 15 | 16 |
| Multi layered coating film | Interference color (bluish) development state of highlight | 2~3 | 3 | 2 | 2~3 | 3 | 2 | 3 | 3 | 1 | 1~2 | 1 | 3 | 1 | 0 | 0 | 2 | 2 | 0~1 | 1~2 |
| | Transparent color (yellowish) development state of shade | 1~2 | 3 | 3 | 2 | 2 | 2 | 3 | 3 | 1 | 2 | 1 | 2~3 | 1~2 | 0 | 0 | 2 | 2 | 0~1 | 1~2 |
| | Smoothness | ◯ | ◯ | ◯ | ◯ | ◯ | ◯ | ◯ | ◯ | x | Δ | Δ | ◯ | ◯ | ◯ | ◯ | Δ | x | ◯Δ | Δ |
| | Design characteristics produced by the color development of the luster pigment | ◯ | ◯ | ◯ | ◯ | ◯ | ◯ | ◯ | ◯ | x | Δ | ◯ | x | ◯ | ◯ | x | Δ | Δ | x | Δ |
| | Infrared reflectance (%) | 67 | 75 | 82 | 70 | 79 | 73 | 81 | 80 | 80 | 71 | 69 | 72 | 67 | 77 | 71 | 85 | 87 | 72 | 83 |

The following is apparent from the examples and the comparative examples. In the multi layered coating films obtained in Examples 1 to 6, the interference color (bluish) of the highlight is reduced to a slightly or dimly visible level, and the transparent color (yellowish) of the shade is reduced to an almost invisible or slightly visible level, while the design characteristics produced by the color development of the interference luster pigment remain good. In these cases, only the dimly visible bluish color (rate: 3) or slightly or dimly visible bluish color (rate: 2 or 3) of the highlight is rather effective in emphasizing the whole whiteness to the human eye, but a weak level of bluish color (rate: 1) is sensed as being bluish with no emphasis of whiteness by the human eye.

It is suggested that in Example 2, which differs from Example 1 in that the white base coating composition 2 is used to form the white base coating film, the color of titanium dioxide in the white base coating film and the interference color of the luster coating film were overlapped to cancel each other out, so that the bluish color was reduced to a dimly visible level.

In Comparative Example 1, where the volume average particle sizes D90 and D50 of the titanium dioxide pigment are out of the range according to the present invention, the highlight and the shade are visually observed to be bluish and yellowish, respectively. In the example with no titanium dioxide pigment, such as Comparative Example 6, the bluish color of the highlight and the yellowish color of the shade appear intense although, of course, the design characteristics produced by the color development of the interference luster pigment are good.

The highlight looks bluish in both Comparative Examples 2 and 3 where one of the 390 and 350 of the titanium dioxide pigment is out of the range according to the present invention. In Comparative Examples 4 and 5, the mass ratio of the interference luster pigment to the titanium dioxide pigment is out of the range. In Comparative Example 4, where the content of the titanium dioxide pigment is relatively high, the bluish color of the highlight is reduced to a dimly visible level, and the yellowish color of the shade is also reduced to an almost invisible or slightly visible level, but the design characteristics produced by the color development of interference luster pigment are degraded. In Comparative Example 5, where the content of the interference luster pigment is relatively high, the design characteristics produced by the color development of the luster pigment are good, but the highlight and the shade are visually observed to be bluish and yellowish, respectively. Comparative Example 7, the smoothness is good, but the bluish color of the highlight and the yellowish color of the shade appear intense, and no pearl-like color development is visible. In Comparative Examples 8 and 9, the bluish color of the highlight and the yellowish color of the shade are at a slightly visible level, but pearl-like color development is not visible enough. In Comparative Example 9, irregularities are also observed, and the smoothness is poor. In Comparative Example 10, the smoothness is not poor, but the bluish color of the highlight and the yellowish color of the shade appear relatively intense, and no pearl-like color development is visible. In Comparative Example 11, the bluish color of the highlight and the yellowish color of the shade appear more intense than in Comparative Example 7, pearl-like color development is not visible enough, and the smoothness is not good enough.

INDUSTRIAL APPLICABILITY

The present invention provides a luster coating composition capable of forming, in the painting of automobiles and other products, a luster coating film that varies dimly in color with viewing angle, provides a pearl-like coating color with less visible interference or transparent colors, and has a heat-shielding effect. The present invention also provides a multi layered coating film that provides a white pearl coating color, the whiteness of which is remarkable in every direction, and has a high heat-shielding effect, when produced by applying a white base coating composition to a substrate to form a white base coating film and then applying the luster coating composition to the white base coating film.

What is claimed is:

1. A method for producing a multi layered coating film comprising the steps of:
   (1) applying a white base coating composition comprising a titanium dioxide pigment to a substrate to form a white base coating film (step (1)),
   wherein the white base coating film has a L value of not less than 85 and not more than 100,
   (2) applying a luster coating composition comprising an interference luster pigment and a titanium dioxide pigment to the white base coating film to form a luster coating film (step (2)),
   wherein a volume average particle size D90 of the titanium dioxide pigment in the luster coating composition is within a range of 700 to 1200 nm, and a volume average particle size D50 of the titanium dioxide pigment in the luster coating composition is within a range of 250 to 900 nm, and a mass ratio of the interference luster pigment and the titanium dioxide pigment in the luster coating composition is within a range of 10/1 to 5/1 represented in the mass ratio "the interference luster pigment/the titanium dioxide pigment", and
   (3) applying a clear coating composition to the luster coating film to form a clear coating film (step (3)),
   to obtain the multi layered coating film.

2. The method for producing a multi layered coating film according to claim 1, wherein the titanium dioxide pigment in the white base coating composition has a primary average particle size within a range of 200 to 2000 nm.

3. The method for producing a multi layered coating film according to claim 2, wherein the titanium dioxide pigment in the white base coating composition has a volume average particle size D90 within a range of 650 to 2000 nm, and a volume average particle size D50 within a range of 140 to 1100 nm.

4. A multi layered coating film obtained by a method for producing a multi layered coating film according to claim 2.

5. The method for producing a multi layered coating film according to claim 1, wherein the titanium dioxide pigment in the white base coating composition has a volume average particle size D90 within a range of 650 to 2000 nm, and a volume average particle size D50 within a range of 140 to 1100 nm.

6. A multi layered coating film obtained by a method for producing a multi layered coating film according to claim 5.

7. A multi layered coating film obtained by a method for producing a multi layered coating film according to claim 1.

8. The method for producing a multi layered coating film according to claim 1, wherein the titanium dioxide pigment in the luster coating composition coating composition has a primary average particle size within a range of 200 to 2000 nm.

* * * * *